United States Patent
Hisamoto

(10) Patent No.: US 10,313,582 B2
(45) Date of Patent: Jun. 4, 2019

(54) IMAGE PROCESSING APPARATUS WHICH SEPARATES IMAGES INTO GROUPS BASED ON IMAGE PICKUP CONDITION INFORMATION TO PERFORM A CORECTION ON IMAGES USING A SAME IMAGE RESTORATION FILTER WITH RESPECT TO EACH GROUP, IMAGE PICKUP APPARATUS, IMAGE PROCESSING METHOD AND STORAGE MEDIUM

(71) Applicant: CANON KABUSHIKI KAISHA, Tokyo (JP)

(72) Inventor: Shinji Hisamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 15/191,965

(22) Filed: Jun. 24, 2016

(65) Prior Publication Data

US 2016/0379349 A1  Dec. 29, 2016

(30) Foreign Application Priority Data

Jun. 26, 2015 (JP) ................................. 2015-128308

(51) Int. Cl.
*H04N 5/232* (2006.01)
*H04N 9/04* (2006.01)
*H04N 5/238* (2006.01)
*H04N 5/357* (2011.01)

(52) U.S. Cl.
CPC ......... *H04N 5/23229* (2013.01); *H04N 5/238* (2013.01); *H04N 5/23209* (2013.01); *H04N 5/3572* (2013.01); *H04N 9/045* (2013.01)

(58) Field of Classification Search
CPC ......... G06T 5/20; G06T 5/003; G06T 5/2207; G06T 5/00; G06T 5/001; H04N 5/23229; H04N 5/23235; H04N 5/3572
See application file for complete search history.

(56) References Cited

U.S. PATENT DOCUMENTS

2010/0328480 A1* 12/2010 Kikuchi ............. H04N 5/23209
                                                    348/222.1

FOREIGN PATENT DOCUMENTS

JP    2013-161278 A    8/2013
JP    2014-150421 A    8/2014

* cited by examiner

*Primary Examiner* — Albert H Cutler
(74) *Attorney, Agent, or Firm* — Cowan, Liebowitz & Latman, P.C.

(57) ABSTRACT

An image processing apparatus includes an image acquisition unit (113) that acquires a plurality of images, an information acquisition unit (114) that acquires each image pickup condition information while imaging the plurality of images, a memory unit (108) that stores an optical transfer function corresponding to the image pickup condition information, a correction unit (111) that generates an image restoration filter from the optical transfer function on the basis of the image pickup condition information so as to correct the plurality of images using the image restoration filter, and a correction control unit (110) that causes the correction unit to correct the plurality of images acquired by the image acquisition unit in order based on the image pickup condition information.

16 Claims, 18 Drawing Sheets

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

FIG. 2

IMAGE PROCESSING APPARATUS WHICH SEPARATES IMAGES INTO GROUPS BASED ON IMAGE PICKUP CONDITION INFORMATION TO PERFORM A CORECTION ON IMAGES USING A SAME IMAGE RESTORATION FILTER WITH RESPECT TO EACH GROUP, IMAGE PICKUP APPARATUS, IMAGE PROCESSING METHOD AND STORAGE MEDIUM

BACKGROUND OF THE INVENTION

Field of the Invention

The present invention relates to an image processing apparatus and an image processing method, more particularly, to a correction of a deteriorated image using image restoration processing.

Description of the Related Art

Since an optical transfer function (OTF) varies according to an image pickup state, such as a zoom position and a diaphragm diameter, changing an image restoration filter in accordance with the image pickup state is required. Meanwhile, storing correction values corresponding to all optical parameters, such as a focal length and a diaphragm value, obtained during imaging makes a data size of the correction values enormous and requires a large capacity memory in an image pickup apparatus.

Japanese Patent Laid-Open No. 2013-161278 discloses an image processing apparatus that determines to perform either of image restoration processing using cached data according to an image pickup state or a regeneration of an image restoration filter so as to reduce a processing time of the image restoration processing.

Moreover, Japanese Patent Laid-Open No. 2014-150421 discloses a reduction method of a data quantity and an operation amount that performs a generation of an image restoration filter only according to a diaphragm value.

However, in conventional techniques disclosed in Japanese Patent Laid-Open No. 2013-161278 Japanese Patent Laid-Open No. 2014-150421, since the image restoration processing is performed in order selecting an image, remaking the same image restoration filter for the image imaged in the image pickup condition applicable the previously generated image restoration filter can be required. The operation amounts of the generation of the image restoration filter are relatively larger compared with other processing, and thus increasing repetition of remaking the image restoration filter causes delay of a processing time and waste of power. As a result, usability for users worsens.

SUMMARY OF THE INVENTION

The present invention provides an image processing apparatus capable of correcting a plurality of images using an image restoration filter in a short time.

An image processing apparatus according to one aspect of the present invention includes an image acquisition unit that acquires a plurality of images, an information acquisition unit that acquires image pickup condition information while imaging the plurality of images, a memory unit that stores an optical transfer function corresponding to the image pickup condition information, a correction unit that generates an image restoration filter from the optical transfer function on the basis of the image pickup condition information so as to correct the plurality of images using the image restoration filter, and a correction control unit that causes the correction unit to correct the plurality of images acquired by the image acquisition unit in order based on the image pickup condition information.

An image processing method according to another aspect of the present invention includes the steps of acquiring a plurality of images, acquiring image pickup condition information while imaging the plurality of images, acquiring an optical transfer function on the basis of the image pickup condition information, generating an image restoration filter from the optical transfer function, and correcting the acquired images using the image restoration filter in order based on the image pickup condition information.

Further features of the present invention will become apparent from the following description of exemplary embodiments (with reference to the attached drawings).

BRIEF DESCRIPTION OF THE DRAWINGS

FIG. 2 is a view illustrating RAW data according to the embodiments of the present invention.

DESCRIPTION OF THE EMBODIMENTS

Exemplary embodiments of the present invention will be described below with reference to the accompanied drawings.

First Embodiment

Figure 1:
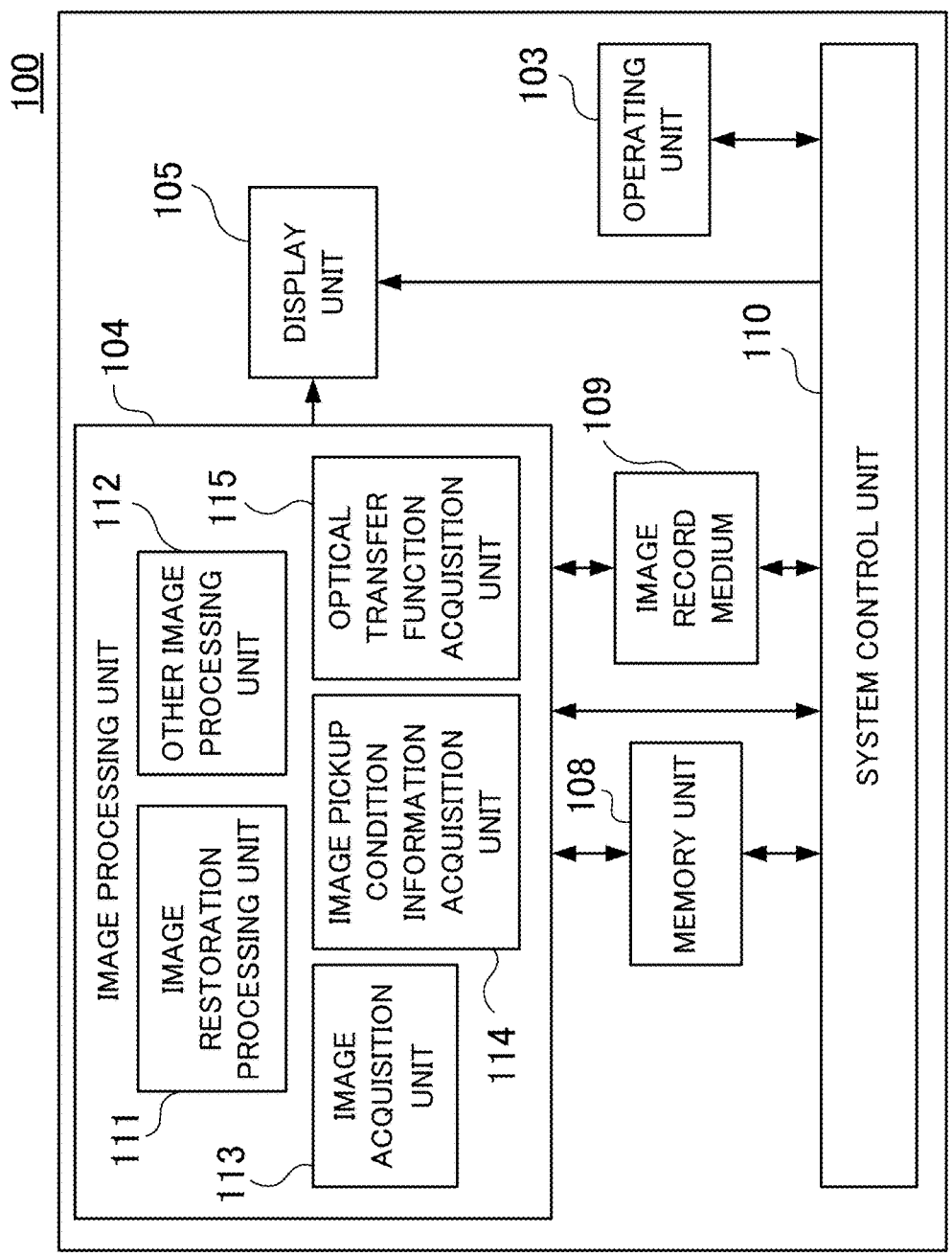
FIG. 1 is a block diagram illustrating an image processing apparatus according to embodiments of the present invention.

FIG. 1 illustrates an image processing apparatus 100 according to a first embodiment. An image processing unit 104 includes an image restoration processing unit (correction unit) 111 that performs image restoration processing and an other image processing part 112 that performs the other processing. The other image processing unit 112 performs pixel interpolation processing. An output image from the image restoration processing unit 111 is what is called a toothless state, in which each pixel does not include all color components. Thus, the other image processing unit 112 performs the pixel interpolation processing on the output image from the image restoration processing unit 111.

An image record medium 109 records a photographed image. The image processing unit 104 performs various processing with respect to image processing. The image processing unit 104 includes the image restoration processing unit 111, the other image processing unit 112, an image acquisition unit 113, an image pickup condition information acquisition unit 114, and an optical transfer function acquisition unit 115. The image pickup condition information acquisition unit 114 acquires image pickup information from the image recorded by the image record medium 109. The image restoration processing unit 111 selects an image restoration filter stored in a memory unit 108 according an image pickup state so as to perform image restoration processing on an image inputted to the image processing unit 104. The memory unit 108 also stores data other than the image restoration filters and information regarding an optical transfer function (OTF) necessary to generate the image restoration filter. The image restoration processing unit 111 may perform the image restoration processing on an image inputted to the image acquisition unit 113 using the image restoration filter generated by selecting the information regarding the OTF according to the image pickup state from the memory unit 108.

The image record medium 109 records an output image processed by the image processing unit 104 in a predetermined format. A display unit 105 may display an image generated by performing display processing on the image subjected to the image restoration processing, and may display an image on which simple image restoration processing is performed or not performed. An operating unit 103 selects the image displayed on the display unit 105 and instructs a start of a correction. A system control unit (correction control unit) 110 performs a series of control.

The processing performed by the image processing unit 104 will be detailed referring to FIGS. 2 to 8.

The image inputted to the image restoration processing unit 111 is RAW data having one color component in each pixel. FIG. 2 illustrates an example of the RAW data that is inputted to the image restoration processing unit 111 and is a common Bayer pattern consisting of a red color (R) component, a green color (G) component and a blue color (B) component.

Figure 3:
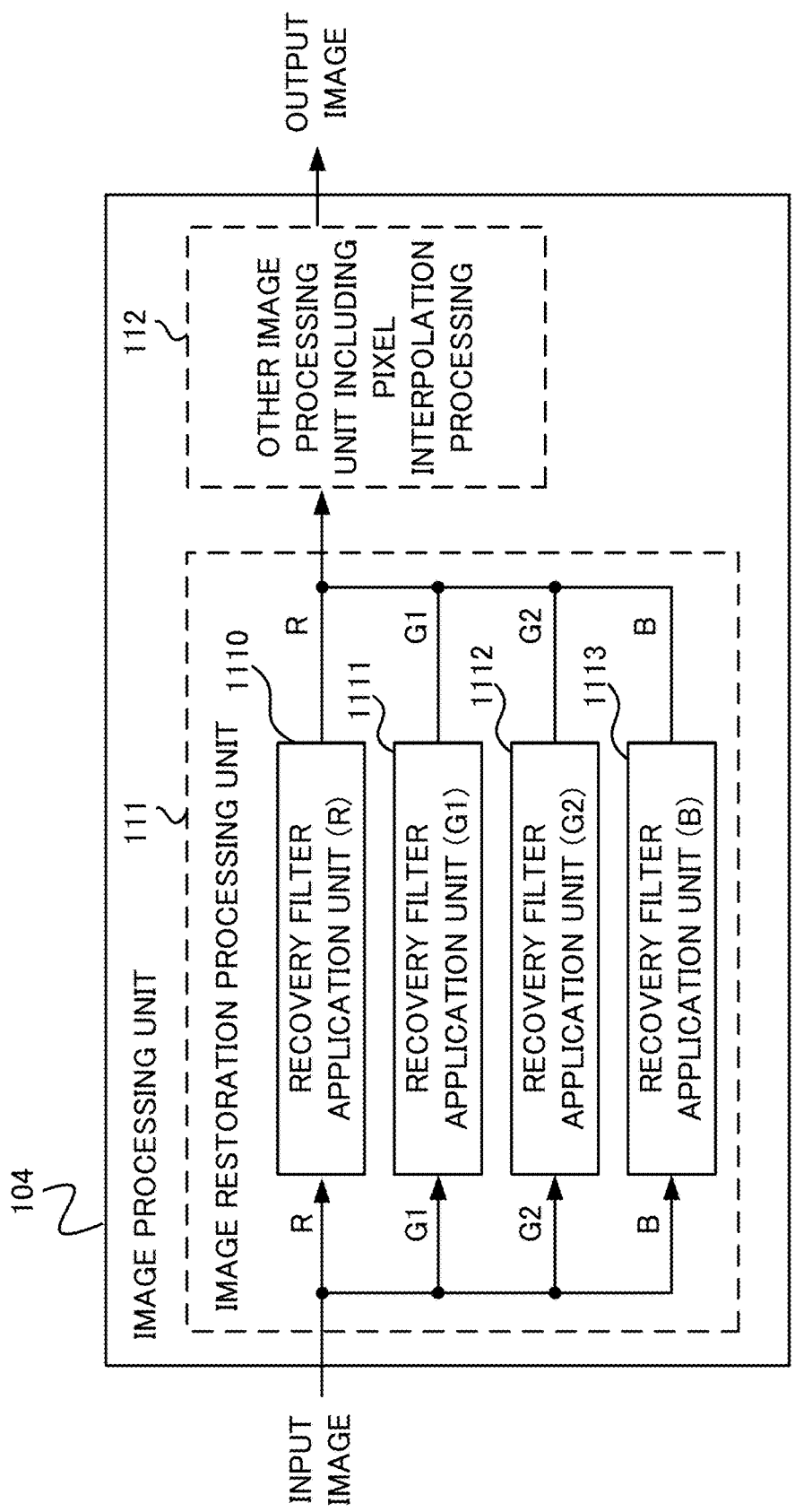
FIG. 3 is a block diagram illustrating an image processing unit of the image processing apparatus according to the embodiments of the present invention.
Figure 4:
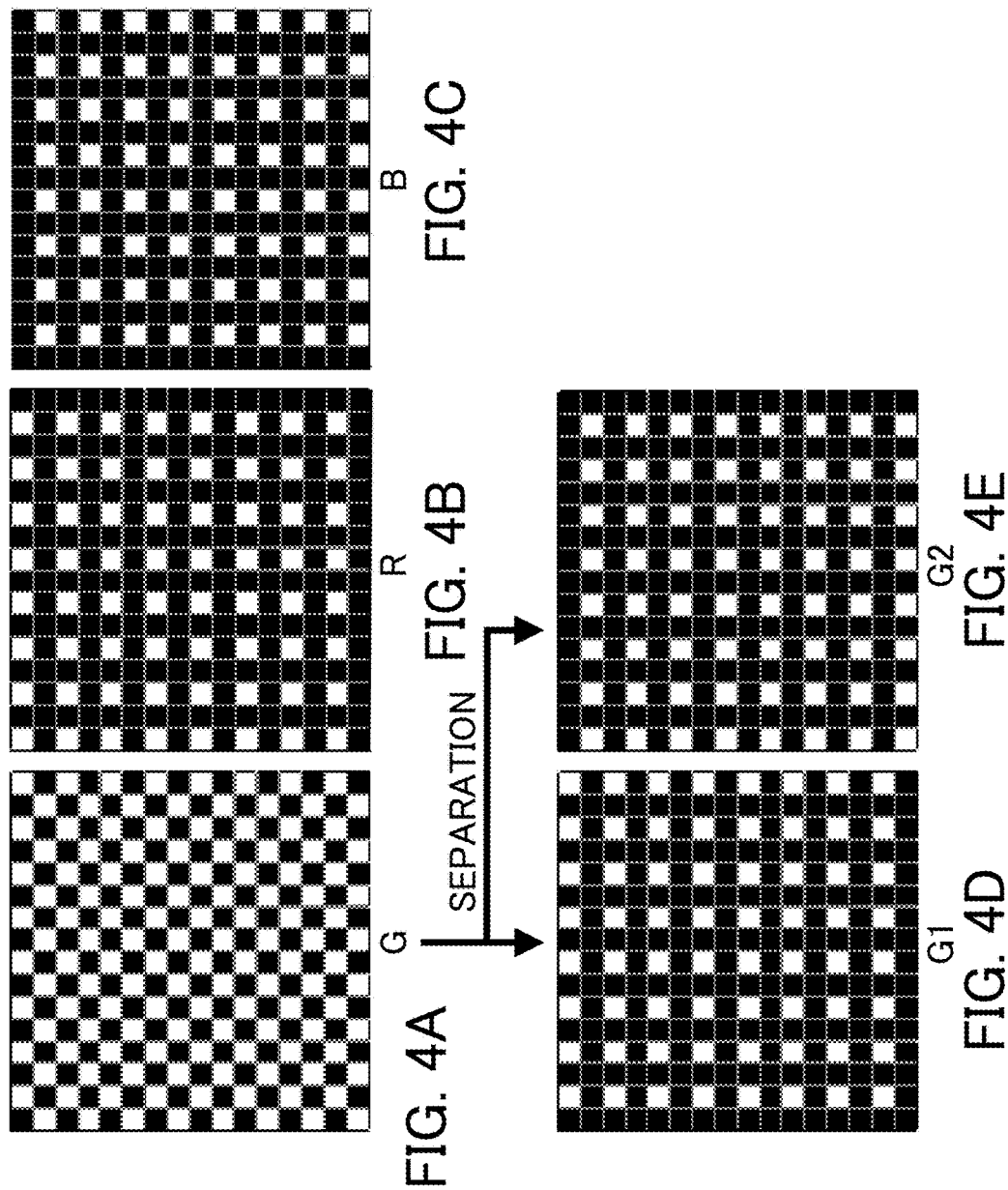
FIGS. 4A to 4E are views illustrating color components and image restoration components according to the embodiments of the present invention.
Figure 5:
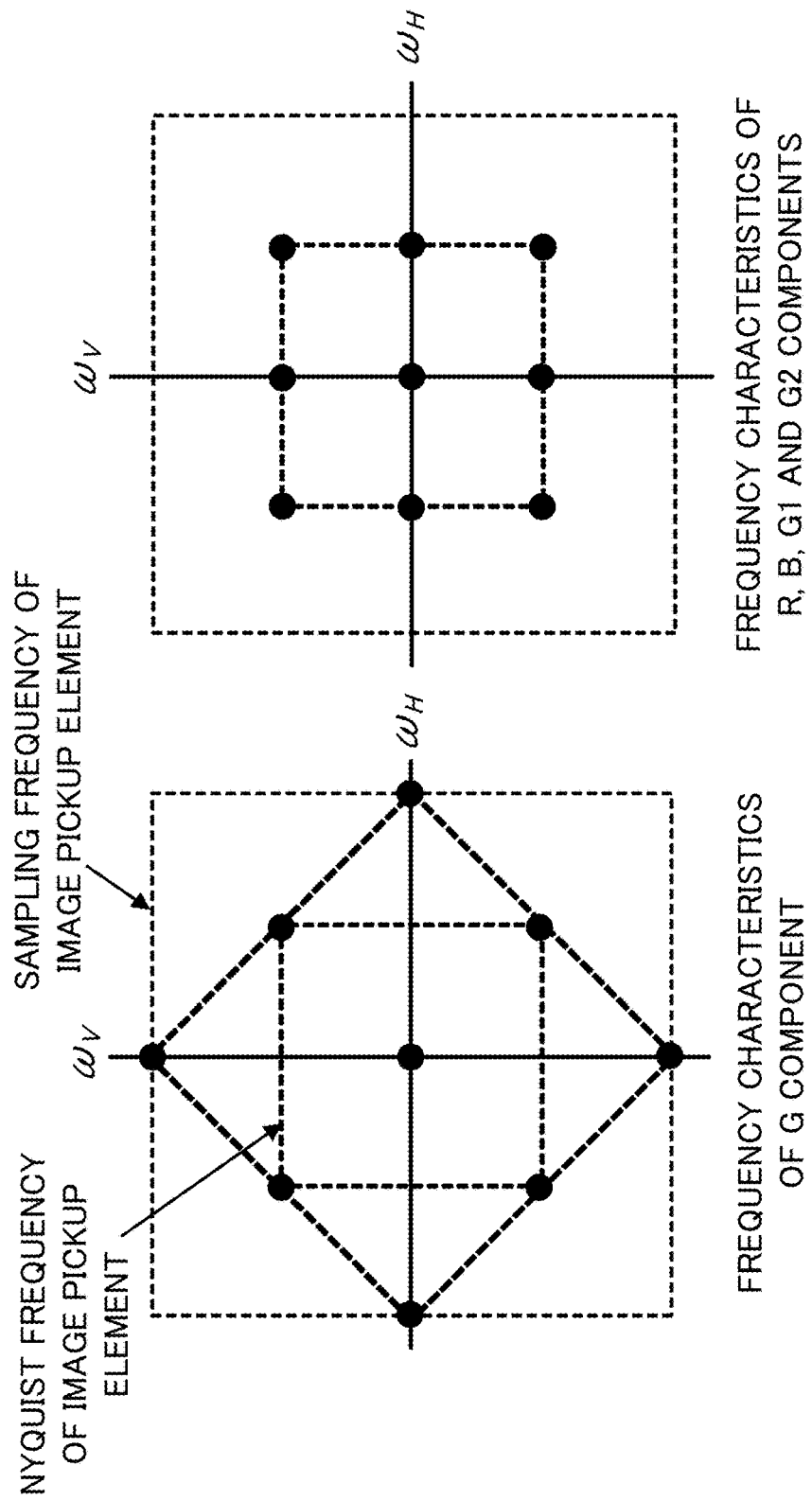
FIGS. 5A and 5B are views illustrating frequency characteristics for each color component according to the embodiments of the present invention.

In this embodiment, the image restoration processing unit 111 separates the G component into G1 and G2 components, and applies the image restoration filter to four image restoration components: R, G1, G2 and B. These four image restoration components are respectively inputted to recovery filter application units 1110, 1111, 1112 and 1113 as illustrated in FIG. 3.

FIGS. 4A to 4E illustrate examples of each color component on the RAW data and the above four image restoration components. FIGS. 4A to 4C respectively illustrates the G component, the R component, and the B component. White pixels illustrated in figures denote each color component. In this embodiment, the image restoration processing is performed on the G1 component of FIG. 4D and the G2 component of FIG. 4E separated from the G component of FIG. 4A.

FIGS. 5A and 5B illustrate frequency characteristics of pixel arrangements of each color component on an image pickup element. In each component illustrated in FIGS. 4A to 4E, a value of pixels (white pixels) for sensing light and a value of pixels (black pixels) for not sensing light are 1 and 0, and functions regarding pixels of each component are respectively expressed as m_G(x, y), m_R(x, y), m_B(x, y), m_G1(x, y) and m_G2(x, y). Frequency characteristics illustrated in FIGS. 5A and 5B correspond to Fourier transformations of the functions: m_G(x, y), m_R(x, y), m_B(x, y), m_G1(x, y) and m_G2(x, y). FIG. 5A illustrates the frequency characteristics of the G component, more specifically FIG. 4A, which are a comb function in which "1", namely, the pixels for sensing light, exist in only positions illustrated as a symbol "●"

FIG. 5B illustrates frequency characteristics of the R and B components respectively illustrated in FIGS. 4B and 4C, which are different from the frequency characteristics of the G component illustrated in FIG. 5A. The frequency characteristics of the G1 and G2 components separated from the G component are illustrated as FIG. 5B as with the frequency characteristics of the R and B components.

Since the frequency characteristics of the G component are different from that of the R and B component as illustrated in FIGS. 5A and 5B, performing the image restoration processing relative to the three color components of R, G and B causes a false color, which is intrinsically non-existent in a range including high-frequency components of the image. Meanwhile, when the G component is separated into the image restoration components of G1 and G2, the frequency characteristics in the pixel arrangements of the four image restoration components of R, G1, G2 and B are equivalent. Thus, since frequency bands, which are a target of the image restoration processing, are the same, a generation of the false color due to the image restoration processing can be suppressed.

Even if the image restoration processing is performed on the three color components of R, G and B, changing a method for generating the image restoration filter applied to the G component can match a frequency band of the corrected G component with that of the R and B components. Though the above restored frequency characteristics are equivalent to that of the image restoration components of G1 and G2 separated from the G1 component, separating the G component into the image restoration components of G1 and G2 is more advantageous in the light of a processing load for a convolution of the image restoration filter as described later.

Hereinafter, a processing flow of the image restoration processing according to the first embodiment performed by the image restoration processing unit 111 will be explained in detail referring to FIG. 6.

As step S201, the image restoration processing unit 111 acquires image pickup state information, such as a focal length, a photographing distance and a diaphragm, while photographing a correction object image. When the information is recorded in an image file, the image restoration processing unit 111 acquires the information by reading from the image file.

Next, at step S202, the image restoration processing unit 111 separates the RAW data consisting of the R, G and B components into the four image restoration components of R, G1, G2 and B. In particular, four image data, in which parts other than a target image restoration component are set to 0, and four ¼-size image data generated by decimating parts other than the target image restoration component may be prepared by components of R, G1, G2 and B.

Next, at step S203, the image restoration processing unit 111 selects an image restoration filter suitable for the actual image pickup state and the four image restoration components of R, G1, G2 and B from the memory unit 108 of FIG. 1. At this time, the selected image restoration filter may be corrected as needed. In other words, the image restoration filter is corrected using prepared discrete data of the image pickup state when actually performing the image restoration processing. Accordingly, the number of data of the image restoration filter, which is previously recorded in the memory unit 108, can be reduced. Moreover, when the memory unit 108 stores not the image restoration filter but information regarding the OTF necessary to generate the image restoration filter, the image restoration processing unit 111 generates the image restoration filter according to the image pickup state based on information regarding the selected OTF.

Figures 7A, 7B:
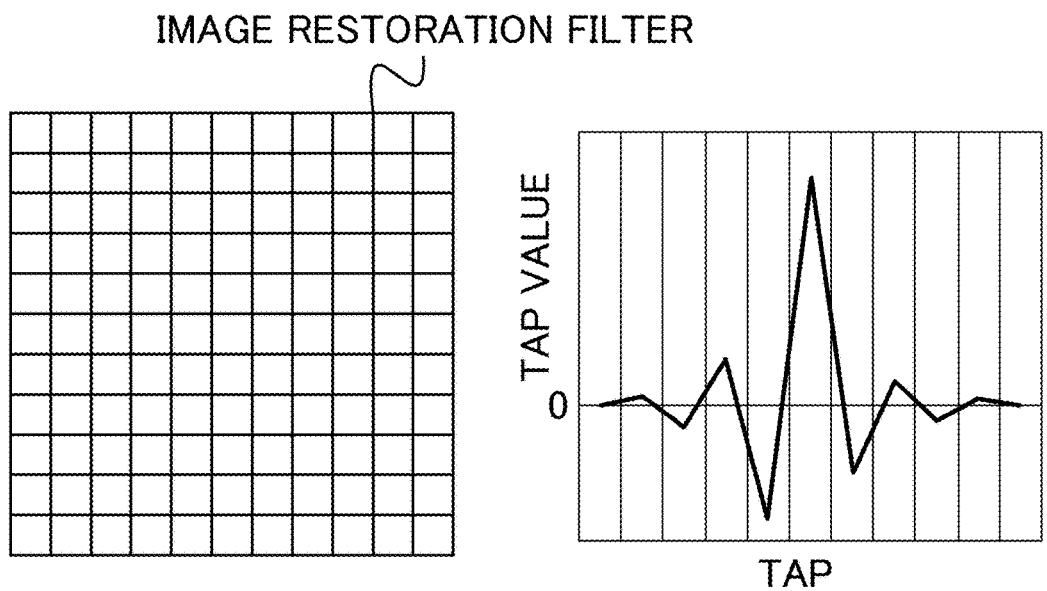
FIGS. 7A and 7B are explanatory views of an image restoration filter according to the embodiments of the present invention.

FIGS. 7A and 7B illustrates schematic views to explain the image restoration filter. The image restoration filter illustrated in FIGS. 7A and 7B is an example of the image restoration filter applied to each color plane of the image, in which each pixel has color components of R, G and B.

The number of taps of the image restoration filter can be determined according to an aberration amount of an image pickup optical system, and the image filter in this embodiment is a two-dimensional filter of 11×11 taps. Each tap of the filter corresponds to one pixel of the image, and is performed by convolution processing in the image restoration processing.

Making the image restoration filter a two-dimensional filter divided into 100 or more as illustrated in FIG. 7A can restore an aberration due to the image pickup optical system, such as a spherical aberration, a comatic aberration, an axial chromatic aberration and an off-axis color flare, which widely spreads from the image formation position.

A value in each tap is omitted in FIG. 7A, and a sectional view of this filter is illustrated in FIG. 7B. This image restoration filter is obtained by performing inverse Fourier transform of the OTF of the image pickup optical system, which is calculated or measured as discussed above. Generally, the image restoration filter is generated using any one of methods for generating a Wiener filter and a relevant restoration filter considering an influence of noises.

Further, the OTF can include a factor to deteriorate the OTF relative to the image inputted to the image processing unit 104. For example, the low-pass filter may suppress a high-frequency component relative to frequency characteristics of the OTF. A shape of pixel apertures and an aperture rate of the image pickup element also influence the frequency characteristics. Besides this, spectroscopic characteristics of a light source and spectroscopic characteristics of various wavelength filters influence the frequency characteristics. The image restoration filter is desirably generated on the basis of a broad OTF considering them.

Moreover, when the image is a color image of an RGB format, three image restoration filters corresponding to each color component of R, G and B are generated. A color aberration exists in the image pickup optical system, and a blur in each color component is different. Accordingly, the characteristics of the image restoration filter for each color component slightly different. This corresponds to differences of the schematic view of FIG. 7A for each color component. An array of the taps of the image restoration filter need not be a square array, and can arbitrarily change when performing the convolution processing.

Figure 8B:
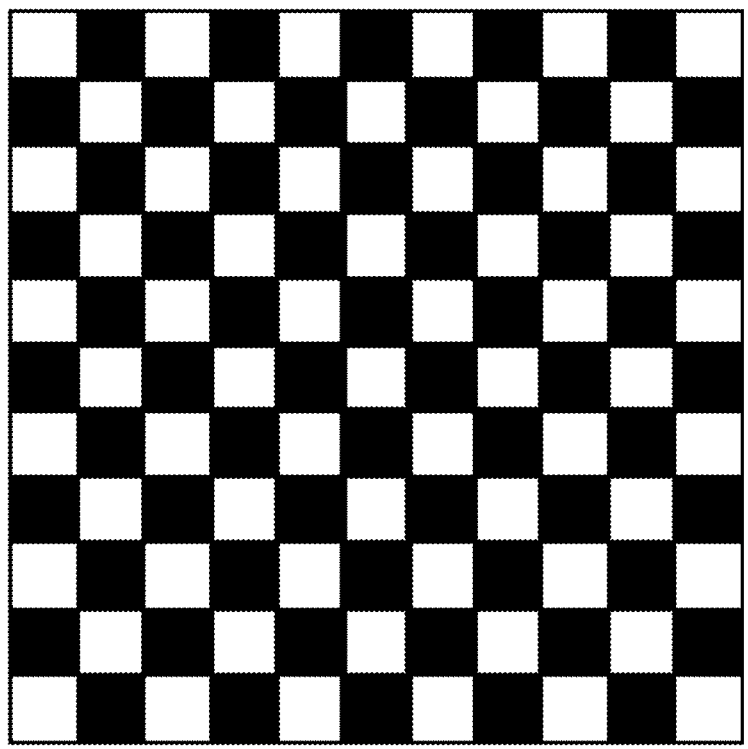
FIGS. 8A and 8B are explanatory views of the image restoration filter according to the embodiments of the present invention.
Figure 8A:
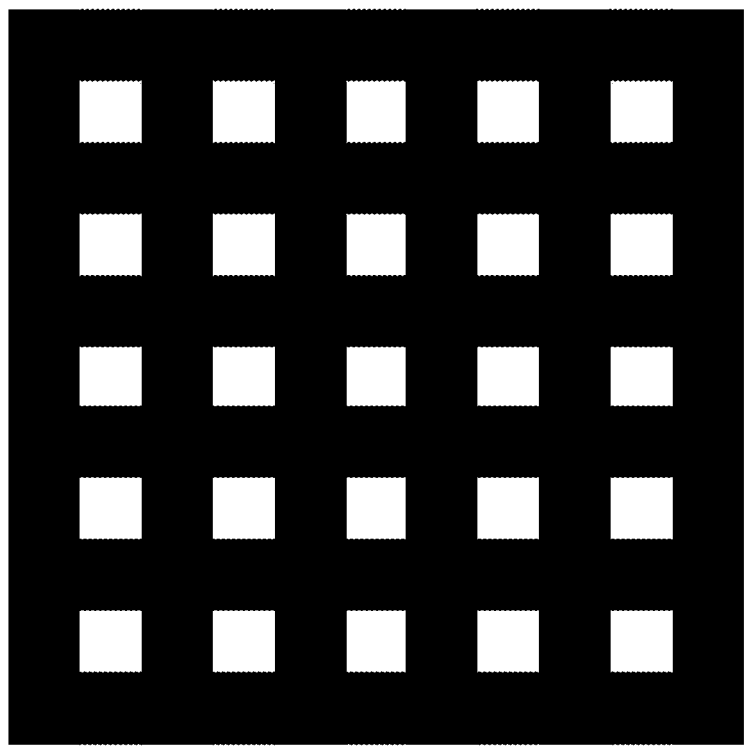

FIGS. 8A and 8B illustrate an example of the image restoration filter applied to an RAW image, in which each pixel has one color component, and the image restoration filter of FIGS. 8A and 8B is different from the image restoration filter applied to each color plane of the image, in which each pixel has color components of R, G and B. The image restoration filter of FIGS. 8A and 8B holds coefficients for pixels, in which a target color component exists, and parts holding the coefficient and parts holding 0 other than the coefficients are respectively indicated as white and block colors.

When the image restoration is performed on the three color components of R, G and B, FIGS. 8A and 8B are respectively the image restoration filter applied to the R and B components and the image restoration filter applied to the G component. However, in the first embodiment of the present invention, the image restoration filter is applied to the G1 and G2 components, which are separated from the G component, instead of the G component and thus the same image restoration filter of FIG. 8A is applied to all of the R, G1, G2 and B components.

Figure 6:
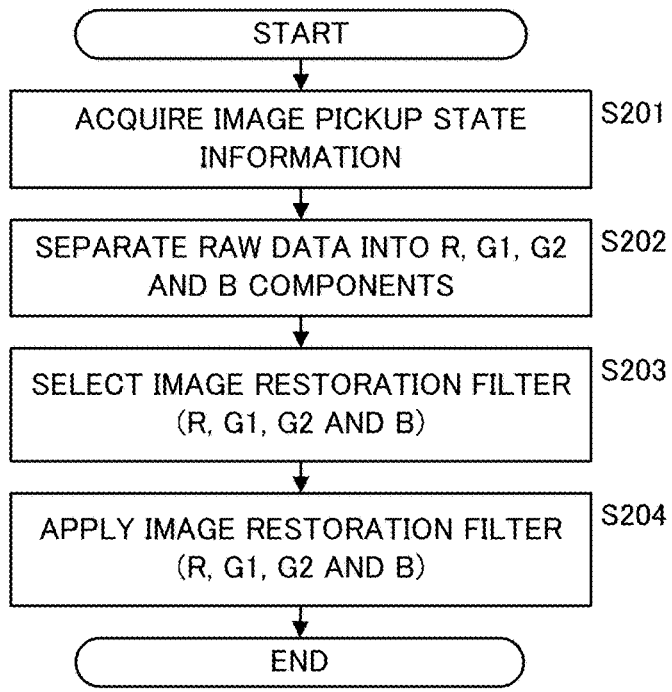
FIG. 6 is a flowchart illustrating image restoration processing of the image processing apparatus according to the embodiments of the present invention.

Next, at step S204 of FIG. 6, the image restoration processing unit 111 performs the convolution processing on each pixel of each image restoration component of the imaged input image using the image restoration filter selected at the step S203. This enables removing or reducing a blur component of the image due to the aberration generated by the image pickup optical system. As discussed above, using the image restoration filter suitable for each color image restoration component can also correct the color aberration.

The convolution processing according to the first embodiment is convolution processing of each image restoration component illustrated in FIGS. 4A to 4E and the image restoration filter illustrated in FIG. 8A. The holding method and the applying method of the image restoration filter may be changed according to the holding method of data of each image restoration component separated at the step S202. For example, when four image data, in which a part other than a target image restoration component is set to 0, is prepared by the R, G1, G2 and B components, limiting pixels that are targets of the convolution processing to the target image restoration component can omit unnecessary calculations.

When four ¼-size image data generated by decimating parts other than the target image restoration component is prepared by the R, G1, G2 and B components, the image restoration filter decimated the parts other than used coefficients can be directly applied to the ¼-size image data.

In both cases, the number of available coefficients obviously lower compared with the image restoration filter of FIG. 7A applied to the image, in which each pixel has the color components of R, G and B, and the image restoration filter of FIG. 8B applied to the G component, and thus a load of the convolution processing is reducible.

As explained above, the image restoration processing unit 111 performs the image restoration processing relative to each pixel on the image along with the processing flow of FIG. 6. Since the OTF in one image pickup state varies according to an angle of view (image height) of the image pickup optical system, the image restoration processing according to this embodiment is desirably changed for a range divided from the image according to the image height. For example, the image restoration filter is scanned on the image to serially change for each range while performing the convolution processing. In other words, the processing of the steps S203 and S204 is performed relative on each target pixel of each image restoration component.

In this embodiment, applying the image restoration filter is explained as the image restoration processing, but, for example, processing added another processing, such as distortion correction processing, peripheral illumination correction processing, and noise reduction processing, before, after, or in the middle of the flow of the present invention may be the image restoration processing.

The image data subjected to the image restoration processing by the image restoration processing unit 111 remains the Bayer pattern. The other image processing unit 112 performs the interpolation processing on the image data subjected to the image restoration processing for each of the three color component held by the image pickup element. The other image processing unit 112 performs well-known developing processing, such as a gamma correction and a color balance adjustment, other than the interpolation processing on the RAW data to generate an image file, such as an image file using a Joint Photographic Experts Group (JPEG) format.

Next, a brief of processing when performing the image restoration on the plurality of images will be explained referring to FIG. 9.

Figure 9:
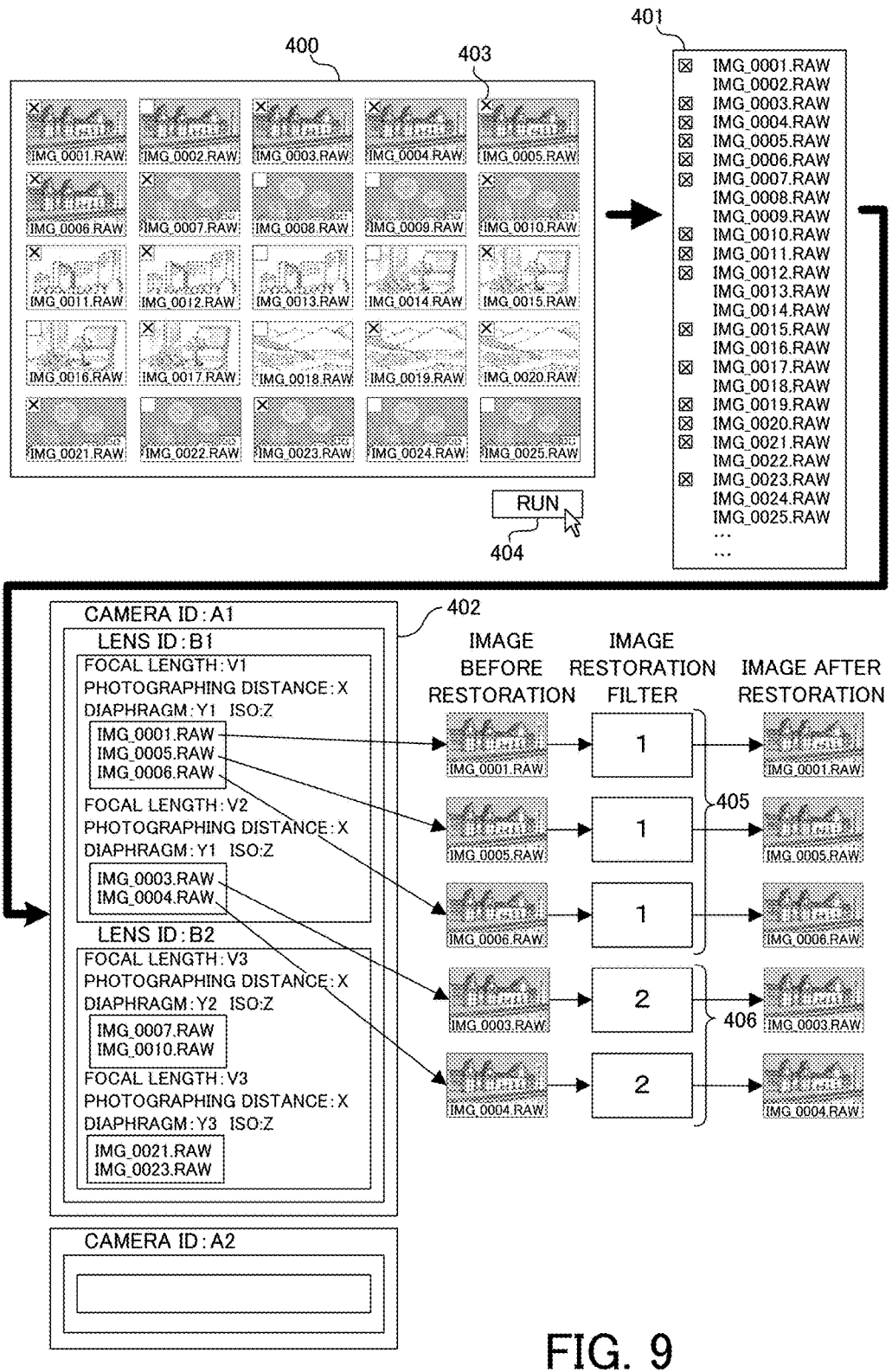
FIG. 9 is a schematic view illustrating image correction processing according to the embodiments of the present invention.

FIG. 9 illustrates a schematic view of processing according to this embodiment when performing the image restoration on the plurality of images. Reference numeral 400 denotes one example of the image data of the image file, which is displayed on the display unit 105 and is recorded in the image record medium 109, when users select the image restoration processing relative to the plurality of images. When users select the image by operating the operating unit 103, the system control unit 110 displays images, in which each mark 403 is selected, on the display unit 105. When the users selects a run button 404 of the image restoration processing by operating the operating unit 103, the system control unit 110 causes the image acquisition unit 113 of the image processing unit 104 to serially read the selected image of an image file group 401 recorded in the image record medium 109.

The image pickup condition information acquisition unit 114 analyzes header information of the image file read by the image acquisition unit 113 to acquire the image pickup condition information.

The system control unit 110 rearranges an order of the image pickup condition information acquired by the image pickup condition acquisition unit 114 according to whether or not the same image restoration filter is applicable so as to generate a list as a display 402, and records the list in the memory unit 108. Performing the image restoration processing according to this list enables the image restoration processing unit 111 to continuously process three image files of IMG_0001.RAW, IMG_0005.RAW, and IMG_0006.RAW using a first image restoration filter 405. Accordingly, a generation of the first image restoration filter 405 can be suppressed to once. Similarly, the image restoration processing unit 111 can continuously process the image files of IMG_0003.RAW and IMG_0004.RAW using a second image restoration filter 406 generated only once.

Moreover, differences of the image pickup condition between the image file corresponding to the first image restoration filter 405 and the image file corresponding to the second image restoration filter 406 are only whether the focal length is V1 or V2. If data regarding the focal lengths V1 and V2 of focal length data previously discretely prepared is adjacent, the second image restoration filter 406 can be generated without reacquiring all OTF data after a generation of the first image restoration filter 405. Hence, the generating the above list can reduce a processing time.

Hereinafter, a parallel operation of each processing with respect to the image restoration processing according to this embodiment will be explained in detail referring to FIGS. 10 to 13. FIG. 12 illustrates one example of a timing of each processing. Reference numeral 801 denotes image file acquisition processing, 802 list generation processing, 803 OTF data acquisition processing, 804 image restoration filter generation processing, and 805 image restoration processing. Here, a generation time per one image restoration filter is assumed to be longer than the processing time of the image restoration processing on one image and the OTF data acquisition time.

Figure 10:
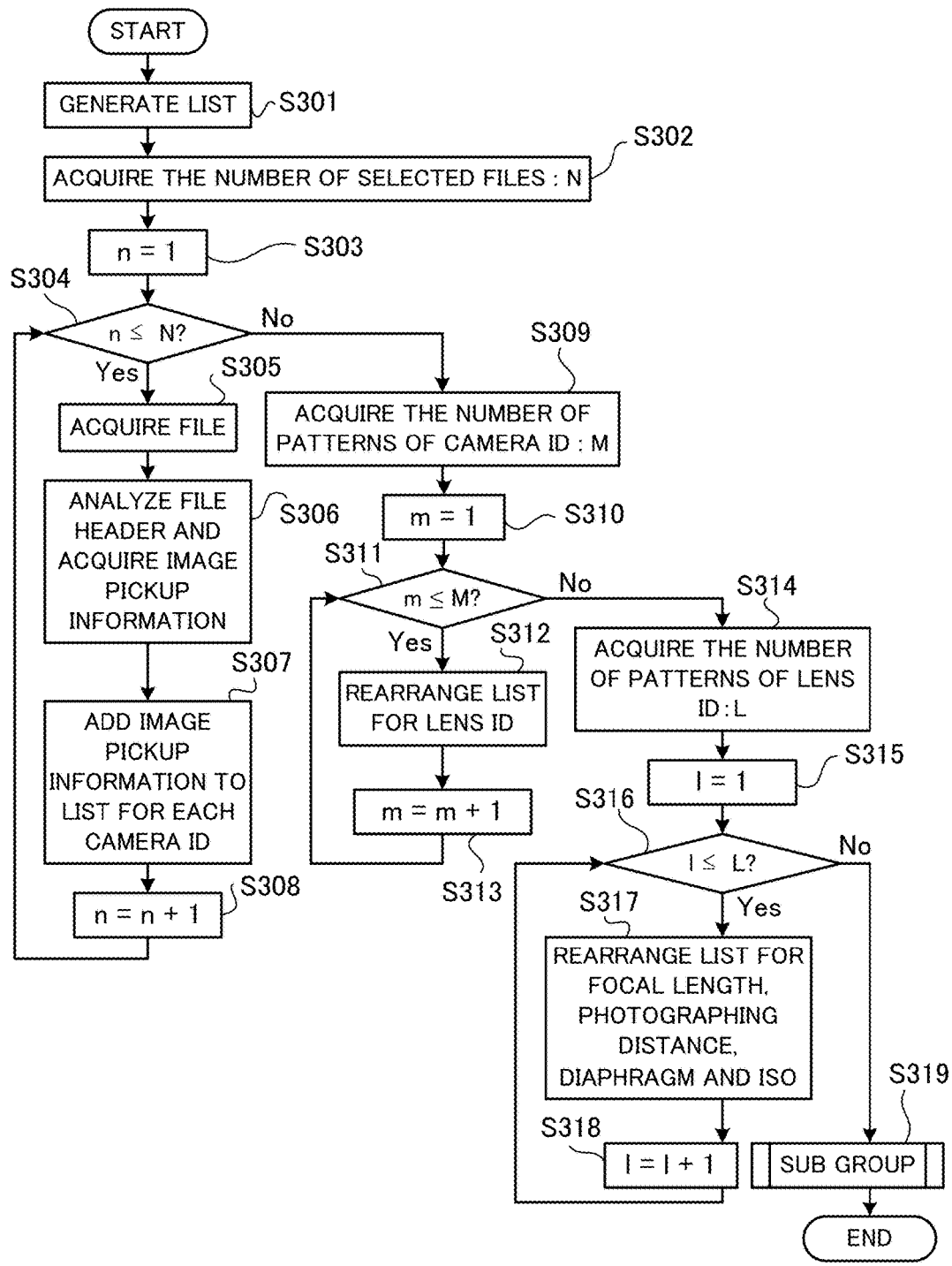
FIG. 10 is a flowchart illustrating list generation processing according to first to third and a fifth embodiments of the present invention.

First, referring to FIG. 10, the image file acquisition processing 801 and the list generation processing 802 while selecting the image restoration processing on the plurality of images will be explained. FIG. 10 is a flowchart of the list generation processing 802.

At step S301, the system control unit 110 generates a new memory area of list in the memory unit 108.

At step S302, the system control unit 110 acquires the number N of the image file selected by users using the operating unit 103.

At step S303, the system control unit 110 initializes an index n to 1.

At step S304, the system control unit 110 determines whether or not the index n is equal to or less than the number N, and if the index n is equal to or less than the number N, advances the flow to step S305, otherwise advances the flow to step S309.

At step S305, the system control unit 110 reads out one of the image file selected by users from the image record medium 109 so as to transmit to the image acquisition unit 113.

At step S306, the system control unit 110 causes the image pickup condition information acquisition unit 114 to analyze a header of the image file transmitted from the image acquisition unit 113, and further to acquire the image pickup condition information.

At step S307, the system control unit 110 stores the acquired image pickup condition information in the memory area of list generated at the step S301 to be grouped for a camera ID.

At step S308, the system control unit 110 increments the index n, and returns the flow to the step S304. In other words, looping from the step S304 to the step S308 enables the system control unit 110 to perform the image file acquisition processing 801 and part of the list generation flow 802 in parallel.

At step S309, the system control unit 110 acquires the number M of patterns of camera ID from the image pickup condition information acquired at the step S306.

At step S310, the system control unit 110 initializes an index m to 1.

At step S311, the system control unit 110 determines whether or not the index m is equal to or less than the number M, and if the index m is equal to or less than the number M, advances the flow to step S312, otherwise advances the flow to step S314.

At step S312, the system control unit 110 further groups the list, which is grouped for each camera ID, for a lens ID, and rearranges an order of the groups according to the lens ID.

At step S313, the system control unit 110 increments the index m, and returns the flow to the step S311.

At step S314, the system control unit 110 acquires the number L of patterns of the lens ID from the image pickup condition information acquired at the step S306.

At step S315, the system control unit 110 initializes an index l to 1.

At step S316, the system control unit 110 determines whether or not the index l is equal to or less than the number L, and if the index l is equal to or less than the number L, advances the flow to step S317, otherwise advances the flow to step S319 so as to perform subgroup rearrangement processing.

At step S317, the system control unit 110 further groups the list, which is grouped according to the camera ID and the lens ID, for each of four conditions of a focal length, a photographing distance, a diaphragm, and an ISO speed so as to rearrange the order of the groups. At the step S317, each of the grouped groups is referred to as "a sub group". A generation method and an arrangement method of the sub groups can be arbitrary set according to a purpose. For example, after generating the sub groups, in which each component has the same four conditions, the sub groups may be rearranged in order of larger value of one of the four conditions.

At step 318, the system control unit 110 increments the index l, and returns the flow to the step S316.

As discussed above, when the image restoration processing is performed on the plurality of image files, the system control unit 110 according to this embodiment previously acquires the image pickup condition information of the plurality of image files before the image restoration processing and generates the list having a hierarchical structure by grouping according to the conditions. This enables processing the image applicable the same image restoration filter at one time and reducing the acquired OTF data. In other words, the images image-restored using a first optical transfer function are collectively processed before (in priority to) the image restoration processing of the image using a second optical transfer function different from the first optical transfer function. As a result, reducing power and shortening a time for the image restoration processing are performable.

Moreover, in this embodiment, as illustrated in FIG. 10, performing the image file acquisition processing 801 and the list generation processing 802 in parallel can further shorten a time for the image restoration processing.

Next, a specific example of the sub group arrangement processing at the step S319 of FIG. 10 will be explained referring to FIG. 11.

Figure 11:
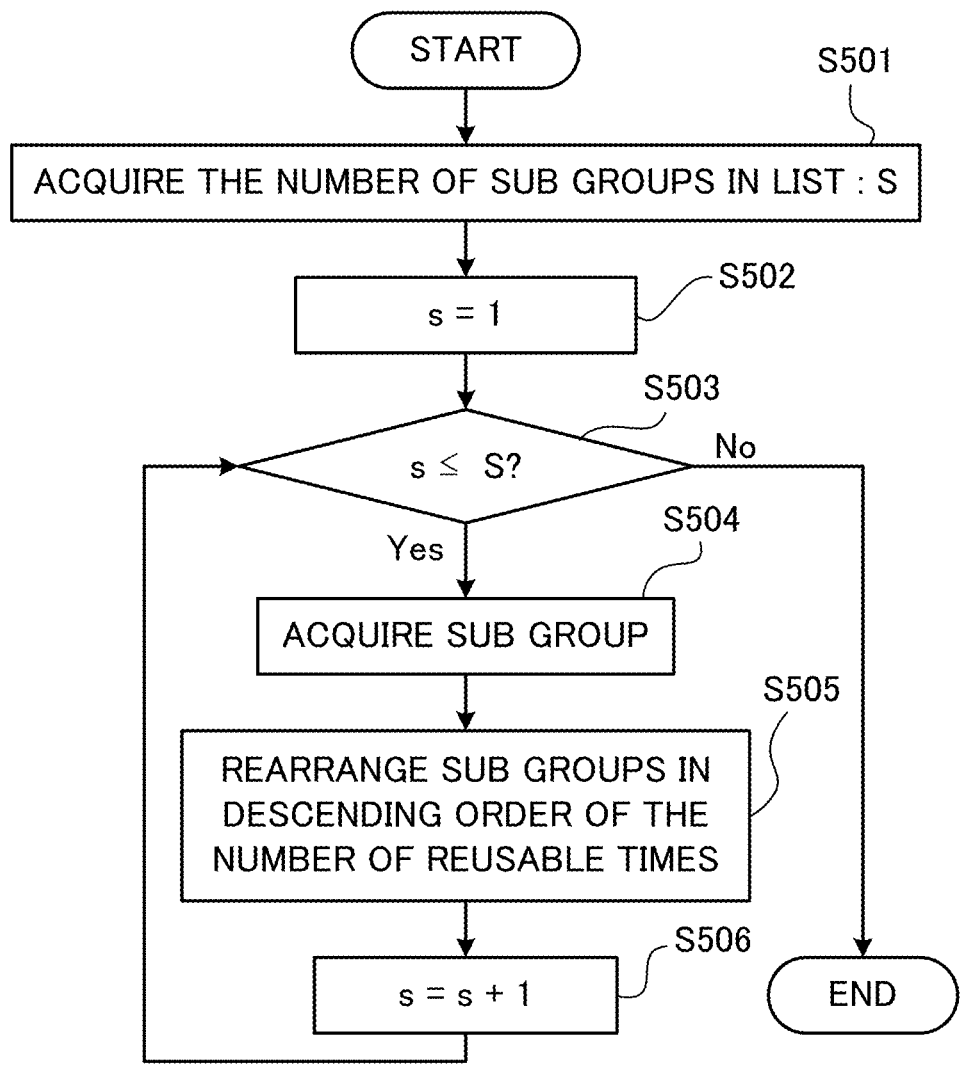
FIG. 11 is a flowchart illustrating list generation processing based on the number of reusable times of an image restoration filter according to the first embodiment of the present invention.
Figure 12:
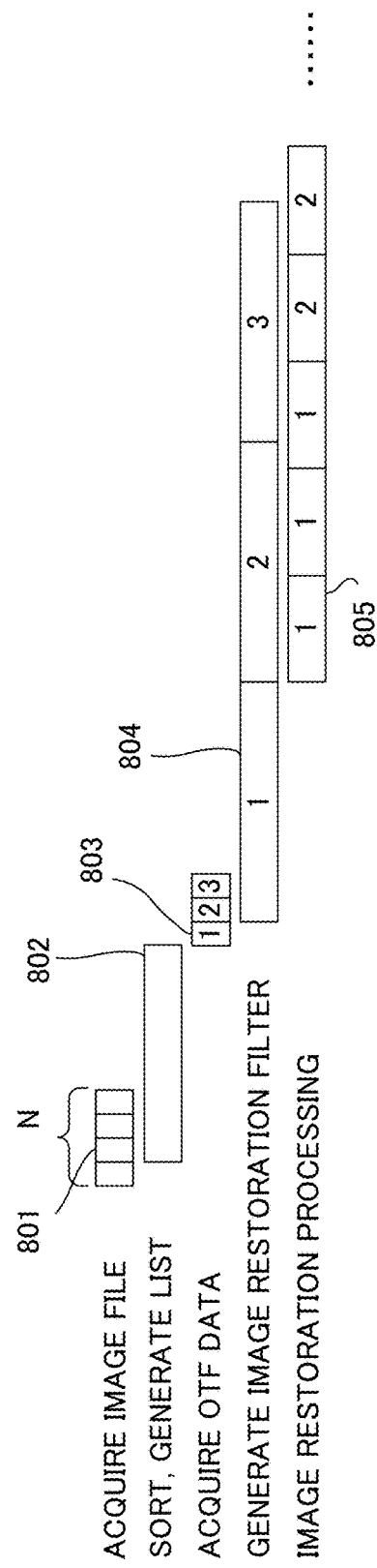
FIG. 12 is a timing chart illustrating a parallel operation of image restoration according to the embodiments of the present invention.

FIG. 11 is a flowchart illustrating the sub group arrangement processing, in which the groups of the list generated in this embodiment are rearranged in descending order of the number of reusable times of the image restoration filter.

At step S501, the system control unit 110 reads out the list recorded in the memory unit 108 to acquire the number S of the sub groups.

At step S502, the system control unit 110 initializes an index s to 1.

At step S503, the system control unit 110 determines whether or not the index s is equal to or less than the number S, and if the index s is equal to or less than the number S, advances the flow to step S504, otherwise ends the sub group arrangement processing.

At step S504, the system control unit 110 extracts the sub group from the list recorded in the memory unit 108 to acquire the number of the image files belonging to the sub group.

At step S505, the system control unit 110 rearranges the sub groups in descending order of the number of the image files in each group.

At step S506, the system control unit 110 increments the index s, and returns the flow to the step S503.

Figure 13:
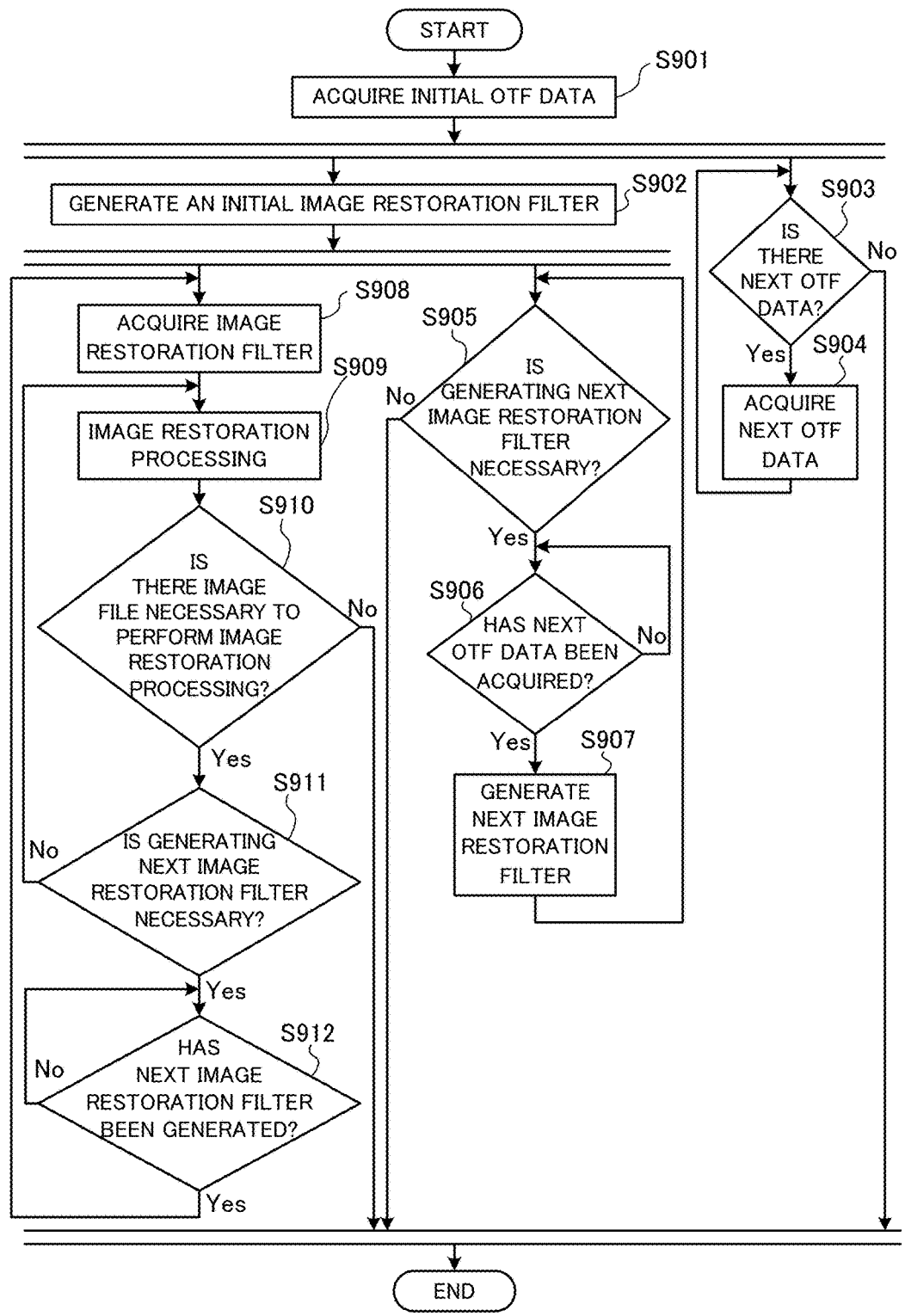
FIG. 13 is a flowchart illustrating the parallel operation of image restoration according to the embodiments of the present invention.

Next, referring to FIGS. 12 and 13, the processing performed after the processing of the image illustrated in FIG. 10, namely, the parallel operations of the OTF data acquisition processing 803, the image restoration filter generation processing 804, and the image restoration processing 805 will be explained. FIG. 13 is a flowchart illustrating the parallel operation of each of these processing.

At step S901, the system control unit 110 reads out the sub groups from the list recorded in the memory unit 108. And, as the OTF data acquisition processing 803, the optical transfer function acquisition unit 115 acquires OTF data corresponding to an initial image file of the sub group on the basis of the image pickup condition information acquired at the step S306.

At step S902, as the image restoration filter generation processing 804, the system control unit 110 causes the image restoration processing unit 111 to generate an image restoration filter corresponding to the initial image on the basis of the OTF data acquired at the step S901. The memory unit 108 stores the generated image restoration filter.

At step S903, the system control unit 110 determines whether or not non-acquired OTF data exists in the sub group in parallel with the image restoration filter generation processing 804 of the step S902. The system control unit 110, if the non-acquired OTF data exists, advances the flow to step S904, and otherwise ends the OTF data acquisition processing 803.

At step S904, the system control unit 110 acquires next OTF data from the memory unit 108, stores the acquired OTF data in a memory unit (not illustrated) inside the image restoration processing unit 111, and returns the flow to the step S903.

Performing the OTF data acquisition processing 803 at the steps S903 and S904 can acquire all necessary OTF data in parallel with the other processing.

At step S905, the system control unit 110 determines whether or not a generation of a new image restoration filter is necessary, if necessary, advances the flow to step S906, and otherwise ends the image restoration filter generation processing 804.

At step S906, the system control unit 110 determines whether or not OTF data used for generating next image restoration filter has been already acquired in the OTF data acquisition processing 803, if the OTF is not acquired, repeats the loop, and otherwise advances the flow to step S907.

At step S907, the system control unit 110 causes the image restoration processing unit 111 to newly generate the image restoration filter on the basis of the OTF data acquired at the step S904. The system control unit 110 stores the generated image restoration filter in the memory unit 108, and returns the flow to the step S905.

Performing the image restoration filter generation processing 804 at the steps S905 to S907 can generate all necessary image restoration filters in parallel with the other processing.

At step S908, the system control unit 110 causes the image restoration processing unit 111 to acquire the image restoration filter necessary to the image restoration processing from the memory unit 108.

At step S909, the system control unit 110 causes the image restoration processing unit 111 to perform the image restoration processing 805 using the image restoration filter acquired at the step S908, and stores the newly numbered image file subjected to the image restoration processing in the image record medium 109.

At step S910, the system control unit 110, if an image file necessary to perform the image restoration processing exists, advances the flow to step S911, and otherwise ends the image restoration processing 805.

At step S911, the system control unit 110 determines whether or not a new image restoration filter for the image file being next performed the image restoration processing is necessary, if necessary, advances the flow to step S912, and otherwise returns the flow to the step S909 otherwise.

At step S912, the system control unit 110 determines whether or not the next using image restoration filter has been already generated in the image restoration filter generation processing 804, if the image restoration filter is not generated, repeats the loop, and otherwise returns the flow to step S908.

Performing the image restoration processing 805 at the steps S908 to S921 can perform the image processing on all image files in parallel with the other processing.

Completing the OTF data acquisition processing 803, the image restoration filter generation processing 804, and the image restoration processing 805 ends all processing of the flowchart illustrated in FIG. 13.

As discussed above, the system control unit 110 according to this embodiment rearranges the sub group of the list in descending order of the number of files of reusable times of the image restoration filter after generating the list of the image files grouped according to the condition so as to include the above hierarchical structure. Performing the parallel operation of the OTF data acquisition processing 803, the image restoration filter generation processing 804, and the image restoration processing 805 using this list can decrease a waiting time and further reduce the time necessary to perform the image restoration processing.

In this embodiment, the parallel operation of the OTF data acquisition processing 803, the image restoration filter generation processing 804, and the image restoration processing 805 is performed after the parallel operation of the image file acquisition processing 801 and the list generation processing 802, but the parallel operation of the all processing may be performed.

Moreover, the image processing apparatus 100 according to this embodiment may be attached to image pickup apparatuses and interchangeable lenses, and may be included in electronic apparatus treating images different from images treated by the image pickup apparatuses.

Second Embodiment

In this embodiment, an image processing apparatus of the present invention is applied to lens interchangeable image pickup apparatuses.

Figure 14:
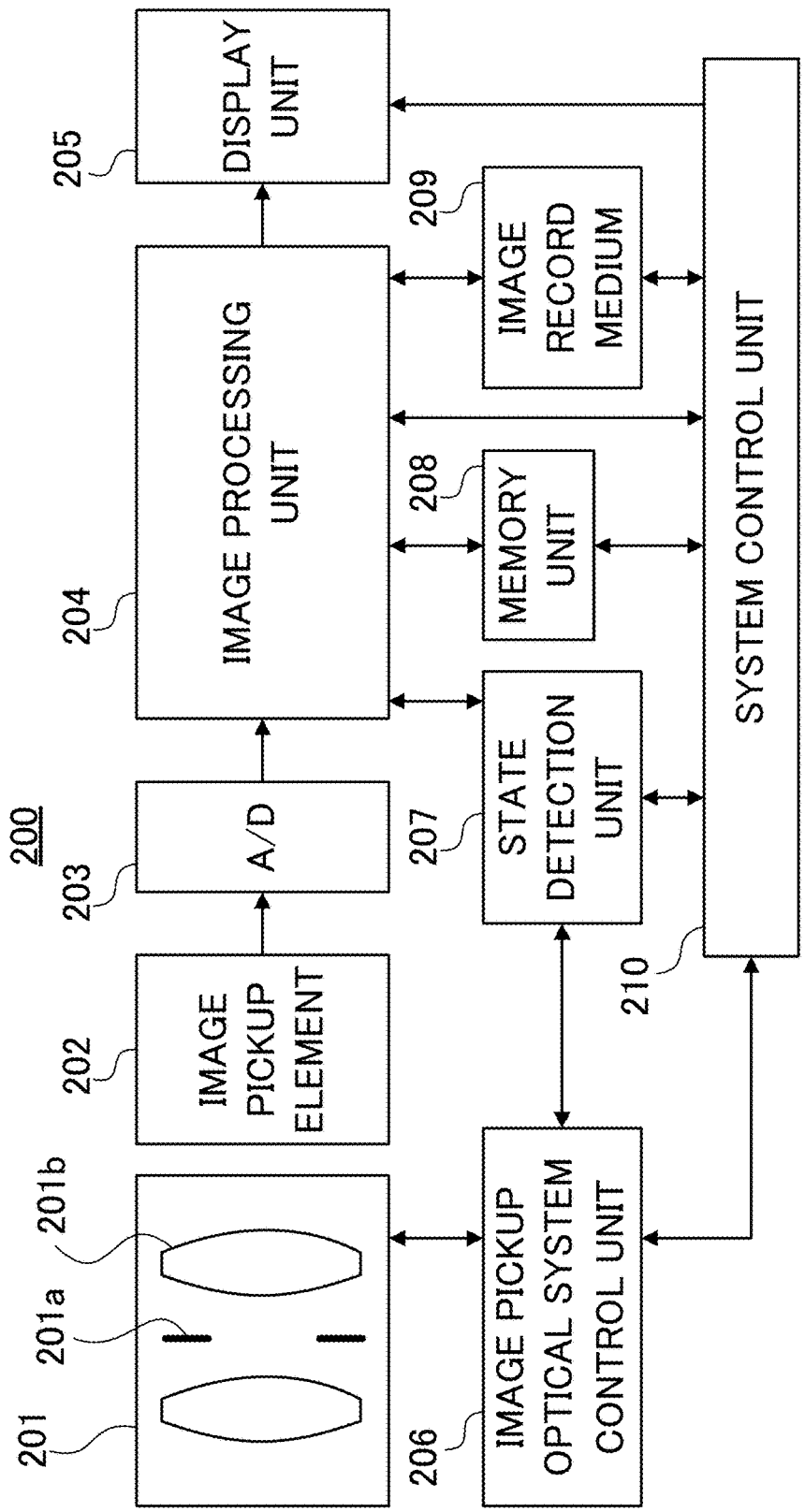
FIG. 14 is a block diagram illustrating an image pickup apparatus according to the second embodiment of the present invention.

FIG. 14 illustrates a lens interchangeable image pickup apparatus 200 according to this embodiment. Reference numeral 201 denotes a lens apparatus provided in the image pickup apparatus 200. Reference numerals 201a and 201b respectively denote a diaphragm and a focus lens of the lens apparatus 201, and are parts of an image pickup optical system. Reference numeral 202 denotes an image pickup element, which images an optical image of an object forming by the image pickup optical system. Reference numeral 203 denotes an A/D conversion unit. Reference numeral 204 denotes an image processing unit, and includes the same configuration of the image processing unit 104 according to the first embodiment. Reference numerals 205, 208, 209 and 210 respectively denote a display unit, a memory unit, an image record medium and a system control unit, and include the same configuration as the corresponding units according to the first embodiment.

Reference numeral 206 denotes an image pickup optical system control unit, which controls the lens apparatus 201 attached to the image pickup apparatus 200 in accordance with an instruction from the system control unit 210. Reference numeral 207 denotes a state detection unit, which detects a current state of the image pickup optical system on the basis of the image pickup optical system control unit 206.

In the first embodiment, in the sub group rearrangement processing, the sub groups are rearranged in descendent order of the number of files of reusable times of the image restoration filter. In this embodiment, in a sub group rearrangement processing, image files imaged by the interchangeable lens attached to the image pickup apparatus are preferentially rearranged in the light of a camera ID included in the image pickup apparatus and a lens ID included in the interchangeable lens.

Figure 15:
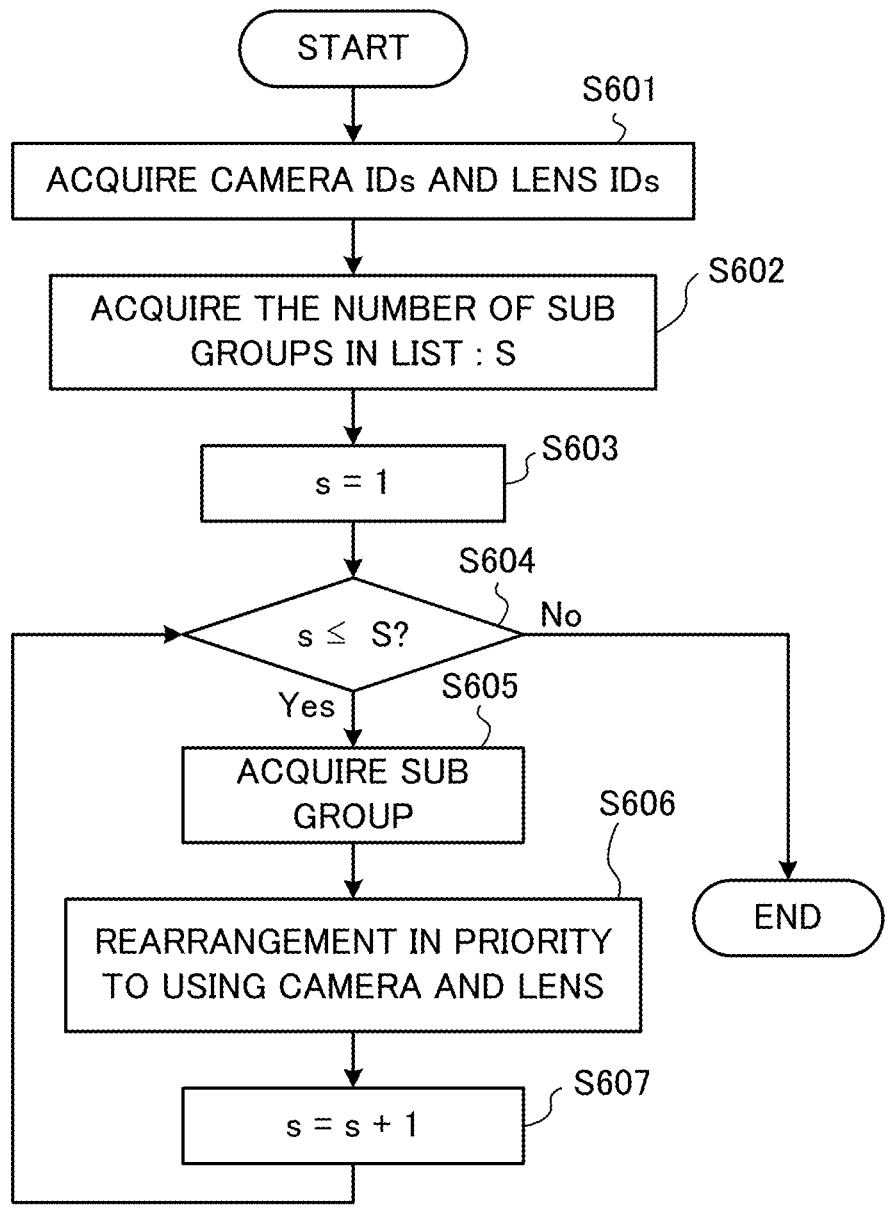
FIG. 15 is a flowchart illustrating list generation processing given priority to a camera ID and a lens ID according to the second embodiment of the present invention.

Hereinafter, the sub group rearrangement processing according to this embodiment will be explained referring to FIG. 15. Explanations of parts overlapped with the first embodiment will be omitted.

At step S601, the system control unit 210 acquires a camera ID (specific camera ID) of the image pickup apparatus and a lens ID (specific lens ID) of the interchangeable lens attached to the image pickup apparatus. In an image processing unit, the camera IDs and the lens IDs may be inputted from the outside by users.

The processing from step S602 to step S607 excluding step S606 is the same processing as the processing from the step S501 to step S506 excluding the step S505 according to the first embodiment.

At step S606, the system control unit 210 searches sub groups matching the camera ID and the lens ID acquired at the step S601, and rearranges the list so that images in the sub groups are firstly processed by image restoration processing.

Generally, image files selected by users are imaged by the image pickup apparatus performing the image restoration. According to this embodiment, the image restoration processing can be performed in order reflecting user's request to check the image file generated by immediately performing the image restoration processing on the image file imaged by currently using camera and lens.

Third Embodiment

In this embodiment, unlike the first and second embodiments, in sub group rearrangement processing, image files in a sub group and the sub groups are rearranged in image pickup date and time order.

Figure 16:
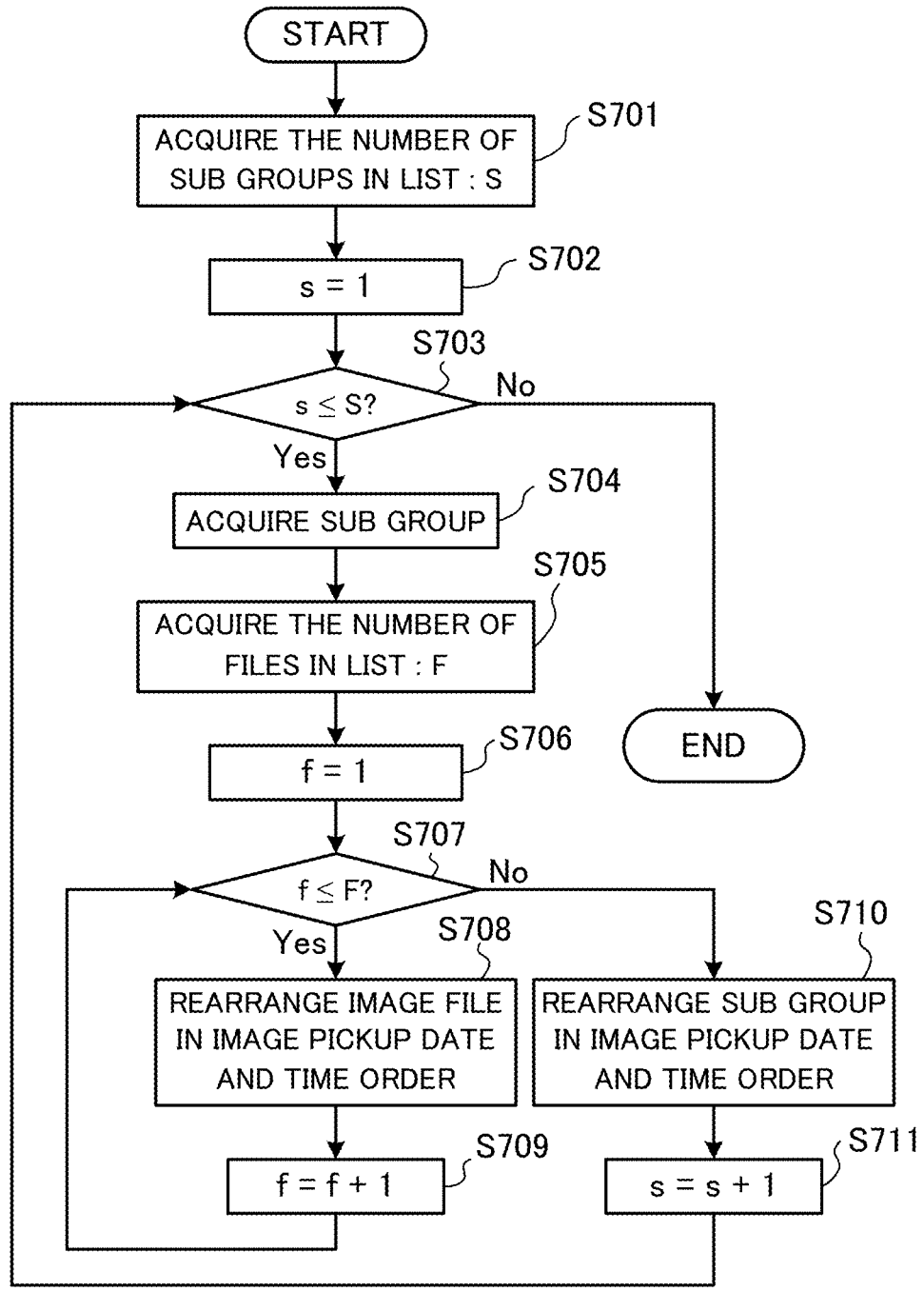
FIG. 16 is a flowchart illustrating list generation processing based on an image pickup date and time according to the third embodiment of the present invention.

Hereinafter, the sub group rearrangement processing according to this embodiment, which is performed by the image processing apparatus according to the first embodiment, will be explained referring to FIG. 16. Explanations of parts overlapped with the first or second embodiment will be omitted. The sub group rearrangement processing according to this embodiment may be performed by the image pickup apparatus according to the second embodiment.

Processing from step S701 to step S704 is respectively the same processing as the processing from the step S501 to step S504 according to the first embodiment. After the processing of these steps, the system controller 110 acquires the number of sub groups from the memory unit 108.

At step S705, the system controller 110 acquires the number of image files F belonging to the sub group.

At step S706, the system controller 110 initializes an index f to 1.

At step S707, the system controller 110 determines whether or not the index f is equal to or less than the number F, if the index f is equal to or less than the number F, advances the flow to step S708, and otherwise advances the flow to step S710.

At step S708, the system controller 110 rearranges the image files in the sub group in order of an early image pickup date and time.

At step S709, the system controller 110 increments the index f, and returns the flow to the step S707.

At step S710, the system controller 110 rearranges the sub groups in order of an early image pickup date and time. The image pickup date and time of the sub group used at the step S710 is the earliest image pickup date and time in the image file belonging to the sub group.

At step S711, the system controller 110 increments the index s, and returns the flow to the step S703.

As discussed above, in the list sectioned by each sub group, the image files in the sub group and the sub groups are rearranged in order of the early image pickup date and time. Accordingly, the processing is performed in order of imaging sequence, and thus is easy to understand for users. In this embodiment, an sequence of the image restoration processing is rearranged in order of the early image pickup date and time, but may be rearranged in an order of a late image pickup date and time.

Fourth Embodiment

According to the first to third embodiments, all image files selected by users are acquired while adding the image pickup information to the list for each camera ID, and subsequently, various rearrangements are performed. In this embodiment, when one image file is acquired, the image pickup information is added to the list in the light of all image pickup conditions, such as a camera ID, a lens ID, a focal length, a photographing distance, a diaphragm, and ISO speed.

Hereinafter, rearrangement processing according to this embodiment, which is performed by the image processing apparatus according to the first embodiment, will be explained referring to FIG. 17. Explanations of parts overlapped with the first to third embodiments will be omitted. The rearrangement processing according to this embodiment may be performed by the image pickup apparatus according to the second embodiment.

Figure 17:
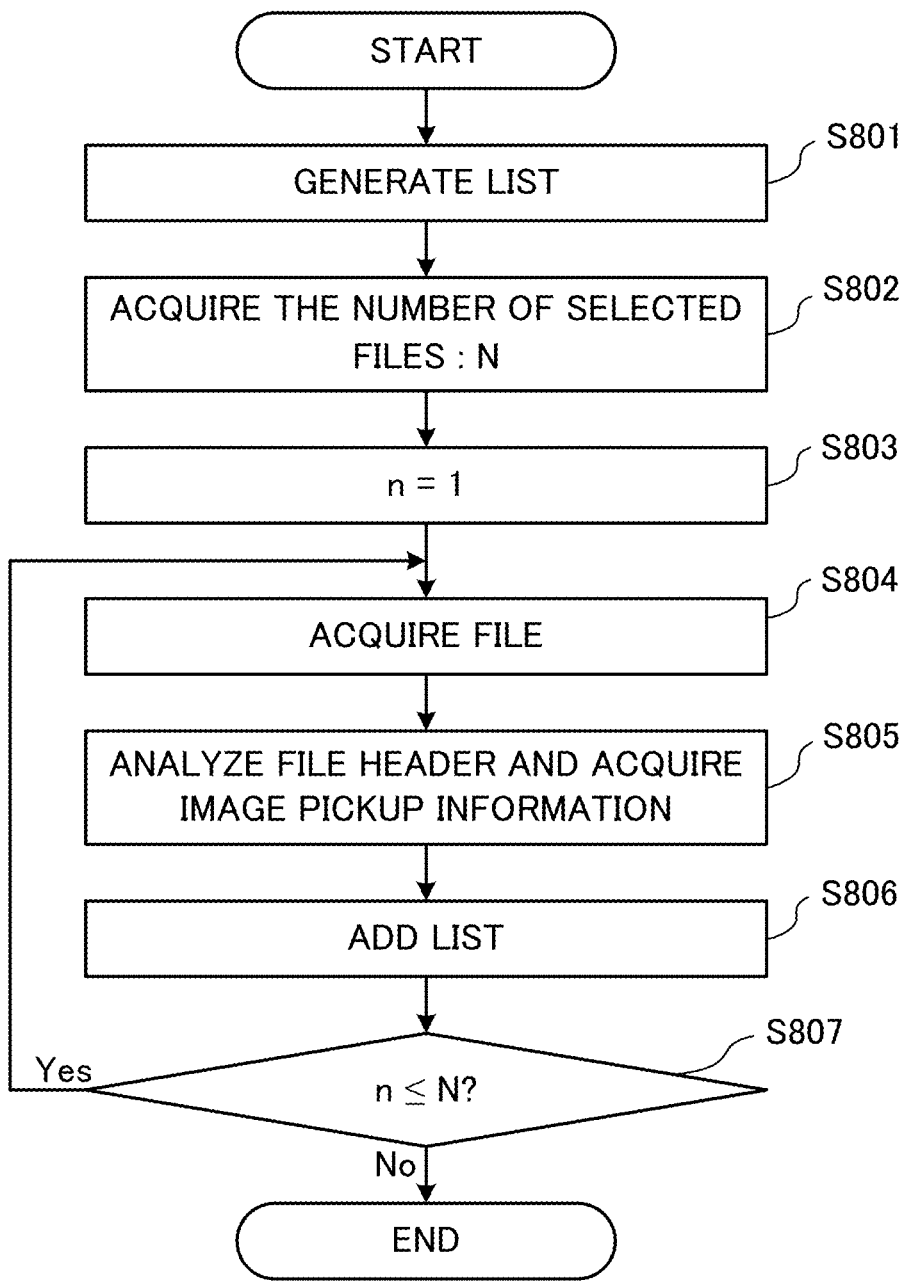
FIG. 17 is a flowchart illustrating a parallel operation of list generation processing according to a fourth embodiment of the present invention.

Steps S801 to S805 are respectively identical with the steps S301 to S303, S305 and S306 of FIG. 17.

At step S806, the system controller 110 stores the acquired image pickup information in the memory area generated at the step S801 so as to be grouped according to the image pickup condition, such as the camera ID.

At step S807, the system controller 110 determines whether or not the index n is equal to or less than the number N, if the index is equal to or less than the number N, advances the flow to the step S804, and otherwise ends the processing.

From the above operation, the acquisition of the image files and the rearrangement processing are performed in parallel, and thus image restoration can be performed on the basis of rearranged information at the time while acquiring the image files. In other words, in the first to third embodiment, the acquisition of the OTF data is started after the acquisition of the image files and the analysis of the image pickup condition information, but in this embodiment, the OTF data can be acquired while acquiring the image files, and thus the processing time is reducible.

Fifth Embodiment

Figure 18:
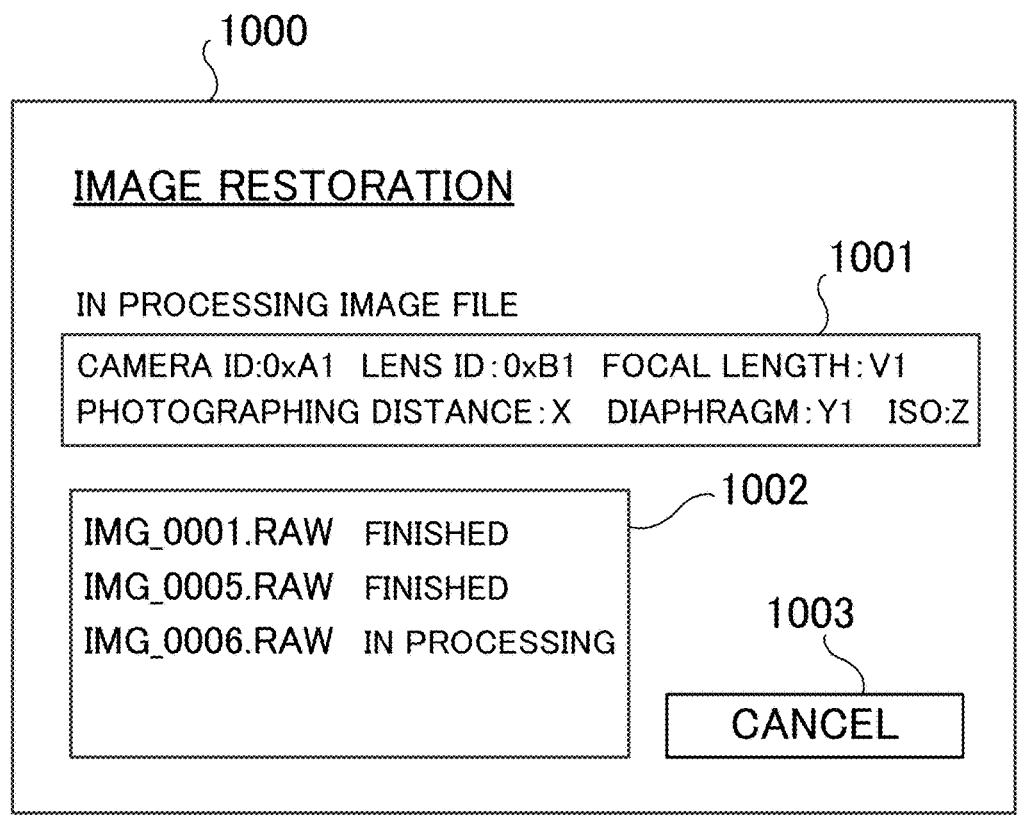
FIG. 18 is a display view while performing image restoration processing according to the fifth embodiment of the present invention.

In this embodiment, an image display of the display unit while the image processing apparatus 100 performs the image restoration processing will be explained referring to FIG. 18.

When the image restoration processing is started, the system controller 110 causes the display unit 105 to display a list 1000 and informs users of a start of the image restoration processing. Reference numeral 1001 denotes a display indicating the image pickup condition used for the image restoration processing, which is performed according to the list rearranging the sub groups and the image files as explained in the first to third embodiments. Reference numeral 1002 denotes a display indicating the order processing image files in the sub group. A status of the processing is also indicated in the display 1002. Reference numeral 1003 denotes a display indicating a button to cancel (interrupt) the image restoration processing according to instructions of users by the operating unit 103.

Figure 19A:
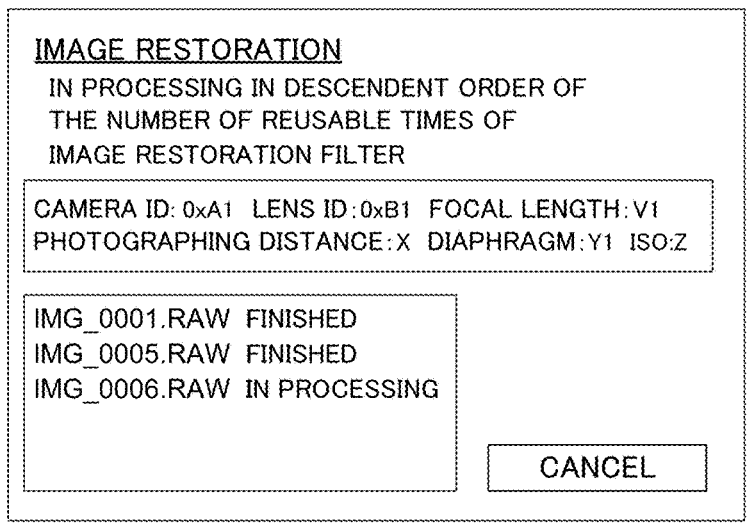
FIGS. 19A to 19C are display views while performing image restoration processing according to the fifth embodiment of the present invention.
Figure 19B:
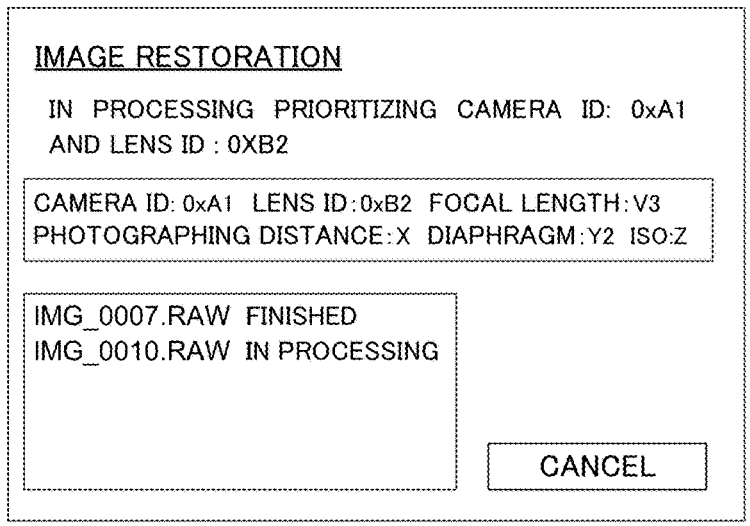
Figure 19C:
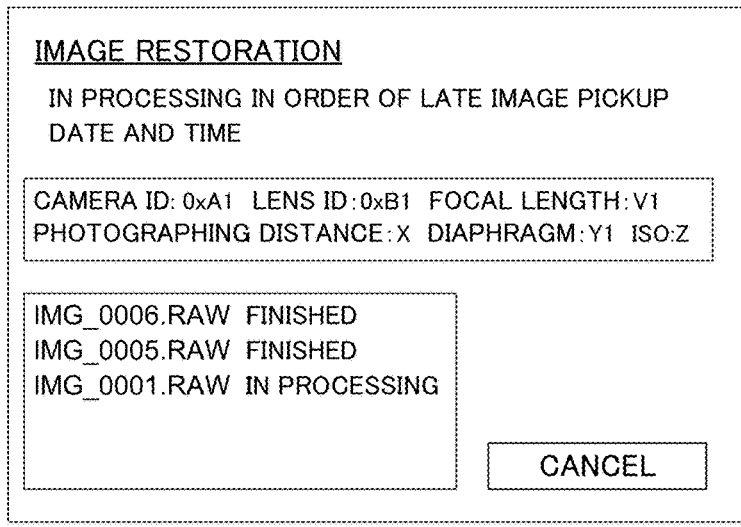

FIGS. 19A to 19C are respectively display views while performing the image restoration processing according to the first to third embodiments.

In FIG. 19A, processing in descendent order of the number of reusable times of the image restoration filter is informed to users. In FIG. 19B, processing in order prioritizing the camera ID and the lens ID of the image pickup apparatus is informed to users. In FIG. 19C, processing in order of the late image pickup date and time is informed to the users.

When users operates the operating unit 103 to cancel the image restoration processing while processing the image restoration processing illustrated in FIG. 18 and FIGS. 19A to 19C, the system controller 110 records to what extent the image restoration processing has been performed in the list stored in the memory unit 108. Moreover, the image file on which the image restoration processing is not performed is recorded in the image record medium 109 so as to relate to the generated image restoration filter stored in the memory unit 108.

When the image restoration processing is restarted, the image restoration processing relative to the image file that is not processed by the image restoration processing restarts in reference to the list stored in the memory unit 108.

As discussed above, since the detail of the current performing image restoration processing is informed to users, users always understand a priority standard for performing the image restoration processing, an order processing the image file, and progress of the processing (processing status). Thus, convenience of the users can be increased in processing requiring time like the image restoration.

Additionally, when the users intentionally performs cancel processing, remaking the image restoration processing is omissible in next image restoration processing. Accordingly, convenience of users can be further increased.

Other Embodiment

The present invention is realizable using processing based on a program that realizes one or more functions according to the above embodiments and is supplied to a system or an apparatus through a network or a storage medium by one or more processors in a computer of the system or the apparatus. The present invention may be also realizable by a circuit (for example, an application specific integrated circuit (ASIC)) that realizes one or more function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-128308, filed on Jun. 26, 2015, which is hereby incorporated by reference herein in its entirety.

What is claimed is:

1. An image processing apparatus comprising:
    a memory that stores an optical transfer function;
    one or more processors; and
    a storage medium including instructions that, when executed by the one or more processors, cause the one or more processors to;
    read a plurality of images;
    analyze header information of the plurality of images to acquire image pickup condition information of each of the plurality of images;
    generate an image restoration filter from the optical transfer function on the basis of the image pickup condition information so as to correct the plurality of images using the image restoration filter; and
    separate the plurality of images into a plurality of groups based on the image pickup condition information to correct images included in each group using a same image restoration filter with respect to each group.

2. The image processing apparatus according to claim 1, wherein the instructions, when executed by the one or more processors, further cause the one or more processors to:
    correct images included in a first group using a first image restoration filter and correct images included in a second group different from the first group using a second image restoration filter different from the first image restoration filter.

3. The image processing apparatus according to claim 1, wherein the instructions, when executed by the one or more processors, further cause the one or more processors to:
    set an order in which a correction using the image restoration filter is performed, in descending order of the number of the images included in each group.

4. The image processing apparatus according to claim 1, wherein the instructions, when executed by the one or more processors, further cause the one or more processors to:
    firstly perform a correction using the image restoration filter on groups matching a specific camera ID and a specific lens ID.

5. The image processing apparatus according to claim 1, wherein the image pickup condition information includes an image pickup date and time, and
    wherein the instructions, when executed by the one or more processors, further cause the one or more processor to:
    set an order performing a correction using the image restoration filter on groups according to the image pickup date and time.

6. The image processing apparatus according to claim 1, wherein the image pickup condition information includes a camera ID, a lens ID, a focal length, a photographing distance, a diaphragm and ISO speed,
    wherein the instructions, when executed by the one or more processors, further cause the one or more processors to:
    generate a first group in which each image pickup condition information of images has the same camera ID, a second group among the first groups in which each image pickup condition information of images has the same lens ID, and a third group among the second groups in which at least one of the focal length, the photographing distance, the diaphragm or the ISO speed of each image pickup condition information of images is identical, and correct the images in the third group using the same image restoration filter.

7. The image processing unit according to claim 1, wherein the instructions, when executed by the one or more processors, further cause the one or more processors to:
    while causing the one or more processors to perform a correction using a first image restoration filter, generate a second image restoration filter that is used for a next correction of the correction using the first image restoration filter.

8. The image processing unit according to claim 1, wherein the instructions, when executed by the one or more processors, further cause the one or more processors to:
    while causing the one or more processors to generate an image restoration filter according to a first optical transfer function, acquire, from the memory, a second optical transfer function that is used for a generation of an image restoration filter next to the first optical transfer function.

9. The image processing unit according to claim 1, wherein the instructions, when executed by the one or more processors, further cause the one or more processors to:
    while causing the one or more processors to determine an order performing a correction using the image restoration filter on a first image acquire a second image different from the first image.

10. The image processing unit according to claim 1, wherein the instructions, when executed by the one or more processors, further cause the one or more processors to:
    generate a signal for an image display that indicates a list of an order of corrections using the image restoration filter of the plurality of images.

11. The image processing unit according to claim 10, wherein the instructions, when executed by the one or more processors, further cause the one or more processors to:
generate a signal adding a processing status of the correction to the list.

12. The image processing apparatus according to claim 1, wherein the instructions, when executed by the one or more processors, further cause the one or more processors to:
record progress of an interrupted generation of the image restoration filter and a correction using the image restoration filter, and the previously generated image restoration filters when processing interrupts, and perform the correction in reference to the recorded image restoration filters and the recorded progress when the interrupted processing restarts.

13. The image processing apparatus according to claim 12, wherein the instructions, when executed by the one or more processors, further cause the one or more processors to:
acquire a plurality of images selected by users.

14. An image pickup apparatus comprising:
an image pickup element that images an optical image of an object formed by an image pickup optical system;
a memory that stores an optical transfer function;
one or more processors; and
a storage medium including instructions that when executed by the one or more processors, cause the one or more processors to;
read a plurality of images imaged by the image pickup element;
analyze header information of the plurality of images to acquire image pickup condition information of each of the plurality of images;
generate an image restoration filter from the optical transfer function on the basis of the image pickup condition information so as to correct the plurality of images using the image restoration filter; and
separate the plurality of images into a plurality of groups based on the image pickup condition information to correct images included in each group using a same image restoration filter with respect to each group.

15. An image processing method comprising the steps of:
acquiring a plurality of images;
analyze header information of the plurality of images to acquire image pickup condition information of each of the plurality of images;
acquiring an optical transfer function on the basis of the image pickup condition information;
generating an image restoration filter from the optical transfer function on the basis of the image pickup condition information so as to correct the plurality of images using the image restoration filter; and
separating the plurality of images into a plurality of groups based on the image pickup condition information to correct images included in each group using a same image restoration filter with respect to each group.

16. A non-transitory computer-readable storage medium configured to store a computer program that enables a computer to execute image processing,
wherein the image processing includes the steps of:
acquiring a plurality of images;
analyze header information of the plurality of images to acquire image pickup condition information of each of the plurality of images;
acquiring an optical transfer function on the basis of the image pickup condition information;
generating an image restoration filter from the optical transfer function on the basis of the image pickup condition information so as to correct the plurality of images using the image restoration filter; and
separating the plurality of images into a plurality of groups based on the image pickup condition information to correct images included in each group using a same image restoration filter with respect to each group.

* * * * *